US008708312B2

(12) United States Patent
Stawarski

(10) Patent No.: US 8,708,312 B2
(45) Date of Patent: Apr. 29, 2014

(54) PRY BAR

(76) Inventor: Rafal Stawarski, Roselle, IL (US)

( * ) Notice: Subject to any disclaimer, the term of this patent is extended or adjusted under 35 U.S.C. 154(b) by 0 days.

(21) Appl. No.: 13/614,193

(22) Filed: Sep. 13, 2012

(65) Prior Publication Data

US 2013/0175486 A1 Jul. 11, 2013

Related U.S. Application Data

(60) Provisional application No. 61/585,216, filed on Jan. 10, 2012.

(51) Int. Cl.

| | |
|---|---|
| ***B66F 3/00*** | (2006.01) |
| ***B25C 11/00*** | (2006.01) |
| ***B66F 15/00*** | (2006.01) |
| ***F16D 11/04*** | (2006.01) |
| ***B25B 23/16*** | (2006.01) |
| *B23Q 3/00* | (2006.01) |

(52) U.S. Cl.

USPC ............... 254/129; 254/25; 254/131; 254/21; 81/177.8; 192/69

(58) Field of Classification Search

USPC ........... 254/129, 21, 25, 131, 26 R; 81/177.8, 81/177.7, 58.3; 403/3, 107, 359.3; 192/69, 192/69.91

See application file for complete search history.

(56) References Cited

U.S. PATENT DOCUMENTS

| | | | | |
|---|---|---|---|---|
| 746,083 | A * | 12/1903 | Holbrook | 254/25 |
| 2,921,773 | A * | 1/1960 | Hoelzer | 254/129 |
| 7,415,911 | B2 * | 8/2008 | Cole et al. | 81/177.8 |
| 7,520,199 | B2 | 4/2009 | Stawarski | |
| 7,682,099 | B2 * | 3/2010 | Cole | 403/97 |
| 8,297,596 | B2 * | 10/2012 | Su | 254/129 |
| 8,511,207 | B2 * | 8/2013 | Su | 81/177.7 |
| 2006/0260445 | A1 * | 11/2006 | Cole | 81/177.8 |

* cited by examiner

*Primary Examiner* — Lee D Wilson
*Assistant Examiner* — Alvin Grant
(74) *Attorney, Agent, or Firm* — Kinne IP Group; Charles C Kinne; Mary E. Adams

(57) ABSTRACT

An indexable tool includes a handle, an indexable tool body and a coupling subassembly. The coupling subassembly rotatably joins and selectively locks and unlocks the handle and the indexable tool body in rotatable relation to each other. The coupling subassembly includes a push button fixedly coupled to a push button cylinder, adjacently disposed first and second serrated inserts, a cap, a cap retention ring, a push button retainer clip and a spring. The cap is held in fixed position with the cap retention ring. The spring is biased to hold the coupling subassembly in a locked position to prevent relative rotation between the tool body and the handle. In an unlocked position the push button is pushed against the bias of the spring to slidably move the coupling subassembly into a position enabling relative rotary movement of the handle relative to the indexable tool.

15 Claims, 13 Drawing Sheets

PRY BAR

CROSS-REFERENCE TO RELATED APPLICATIONS

This application relates to and claims priority from U.S. Provisional Patent Application Ser. No. 61/585,216 filed Jan. 10, 2012.

FIELD OF THE INVENTION

This disclosure relates to improvements in a pry tool. In particular, the disclosure provides an improved and simplified construction of a tool having many of the advantages and features shown in the prior art design disclosed in U.S. Pat. No. 7,520,199. As set forth in that disclosure, an indexable tool includes a handle, an indexable tool body and a splined coupling subassembly which rotatably joins and selectively locks and unlocks the handle and the indexable body together. The disclosure herein relates to improvements to the splined coupling subassembly and the mechanism for retaining the parts thereof in communication with one another.

BACKGROUND OF THE INVENTION

There is a need for an indexable tool that has operating components that can be rotatably joined together for relative movement while also possessing the ability to be selectively locked and unlocked. As disclosed in U.S. Pat. No. 7,520,199, one way to provide such a tool is shown. As superior as the disclosed structure is to its prior art, however, the disclosure thereof suffers drawbacks.

First, the locking subassembly provided therein is complex to assemble, requiring finely aligning a threaded piece with a threaded aperture for assembly. Second, the locking subassembly provided therein is relatively costly to manufacture, thereby pricing the tool beyond the reach of some consumers and depriving them of the considerable advantages to the tool overall. Finally, because of the fine alignment required of the threaded piece in relation to the threaded aperture during assembly, misalignment is possible, thereby rendering the tool somewhat susceptible to damage during the assembly process.

Thus, a problem associated with devices that precede the present disclosure is that they do not provide, in combination with the other features and advantages disclosed herein, an indexable tool that is constructed and arranged to be relatively easy to assemble, obviating the need for finely aligning a threaded piece with a threaded aperture for assembly.

Yet another problem associated with devices that precede the present disclosure is that they do not provide, in combination with the other features and advantages disclosed herein, an indexable tool that is constructed and arranged to be relatively inexpensive to manufacture, thereby pricing the tool within the reach of more consumers and providing them the considerable advantages to the tool overall.

Still a further problem associated with devices that precede the present disclosure is that they do not provide, in combination with the other features and advantages disclosed herein, an indexable tool that is constructed and arranged to be assembled without precision alignment of the threaded piece in relation to the threaded aperture, thereby eliminating the risk of misalignment and thereby rendering the tool less susceptible to damage during assembly.

There is a demand, therefore, to overcome the foregoing problems while at the same time providing an indexable tool that is constructed and arranged to have operating components that can be rotatabiy joined together for relative movement while also possessing the ability to be selectively locked and unlocked that is relatively low in cost to manufacture and yet possesses extended durability.

SUMMARY OF THE INVENTION

In a first preferred embodiment, an indexable tool includes a handle having a first prong formed with a first splined annular shoulder and a second prong formed with a second splined annular shoulder. An indexable tool body is fixedly coupled to a foot, the foot having a splined orifice aligned with the first and second splined annular shoulders. A splined coupling subassembly rotatably joins and selectively locks and unlocks the handle and the indexable tool body in relation to each other. The splined coupling subassembly includes a push button fixedly coupled to a push button cylinder, adjacently disposed first and second serrated inserts, a cap, a cap retention ring, a push button is retainer clip and a spring. The serrated inserts are positioned on the push button cylinder and the serrated inserts have outer splined surfaces variously engaged with the first and second splined annular shoulders and the splined orifice upon slidable movement of the push button. The spring is interposed between the cap and the second serrated insert. The cap is disposed within the second prong and held in fixed relation thereto with the cap retention ring. The push button retainer clip is fixedly coupled to the push button cylinder. The cap retention ring and the push button retainer clip hold together the splined coupling subassembly. In a locked position, the spring is biased to hold the splined outer surfaces of the first and second serrated inserts in common interlocking engagement with the splined orifice of the foot and the first and second splined annular shoulders to prevent relative rotation between the tool body and the handle. In an unlocked position the push button is pushed against the bias of the spring to slidably move the splined outer surface of the first insert into exclusive engagement with the splined orifice of the foot, and the second insert into exclusive engagement with the second splined annular shoulder, thus enabling relative rotary movement of the handle relative to the indexable tool.

In a second preferred embodiment, the indexable tool body has a first prong formed with a first splined annular shoulder and a second prong formed with a second splined annular shoulder. The handle is fixedly coupled to a foot, the foot having a splined orifice aligned with the first and second splined annular shoulders.

In a third preferred embodiment, the push button retainer clip is replaced with a mushroomed endcap fixedly attached to the end of the push button cylinder.

Thus, it is an object of the present disclosure to provide, in combination with the other features and advantages disclosed herein, an indexable tool that is constructed and arranged to be relatively easy to assemble, obviating the need for finely aligning a threaded piece with a threaded aperture for assembly.

Still a further object of the present disclosure is to provide, in combination with the other features and advantages disclosed herein, an indexable tool that is constructed and arranged to be relatively inexpensive to manufacture, thereby pricing the tool within the reach of more consumers and providing them the considerable advantages to the tool overall.

An even further object of the of the present disclosure is to provide, in combination with the other features and advantages disclosed herein, an indexable tool that is constructed and arranged to be assembled without precision alignment of the threaded piece in relation to the threaded aperture, thereby eliminating the risk of misalignment and thereby rendering the tool less susceptible to damage during assembly.

Thus, an indexable tool having the above-mentioned features and advantages is provided, having operating components that can be rotatably joined together for relative movement while also possessing the ability to be selectively locked and unlocked, and further being relatively low in cost to manufacture and yet having extended durability.

BRIEF DESCRIPTION OF THE DRAWINGS

In the detailed description that follows, reference will be made to the following figures.

DETAILED DESCRIPTION OF PREFERRED EMBODIMENTS

Figure 1:
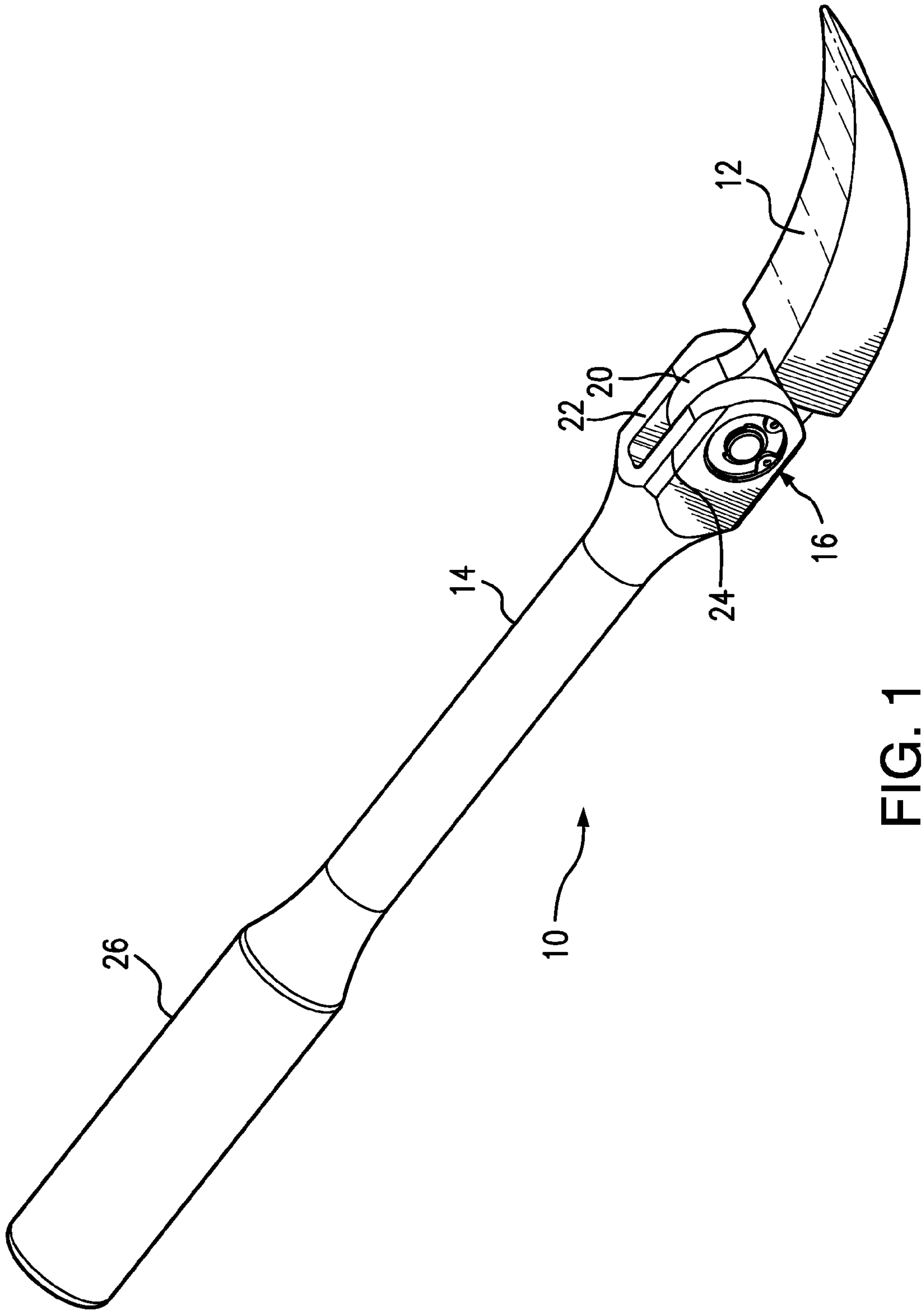
FIG. 1 is a perspective view of a first preferred embodiment of the indexable pry tool.

Referring now to the drawings of the preferred embodiment, an indexable pry tool is described.

Shown in FIG. 1 is a perspective view of a first preferred embodiment of an indexable pry tool 10. The pry tool 10 comprises an indexable tool body 12 rotatably joined to a handle 14 via a splined coupling subassembly 16. The splined coupling subassembly selectively locks and unlocks the handle 14 and indexable tool body 12 together. Handle 14 is provided with a gripping portion 26 at the end opposite the splined coupling subassembly 16.

As shown in FIG. 1, in this first embodiment, a first prong 22 and a second prong 24 are parallel to each other and fixedly mounted to the end of handle 14. Also shown in FIG. 1 is a foot 20, which is fixedly mounted to indexable tool body 12.

Figure 2:
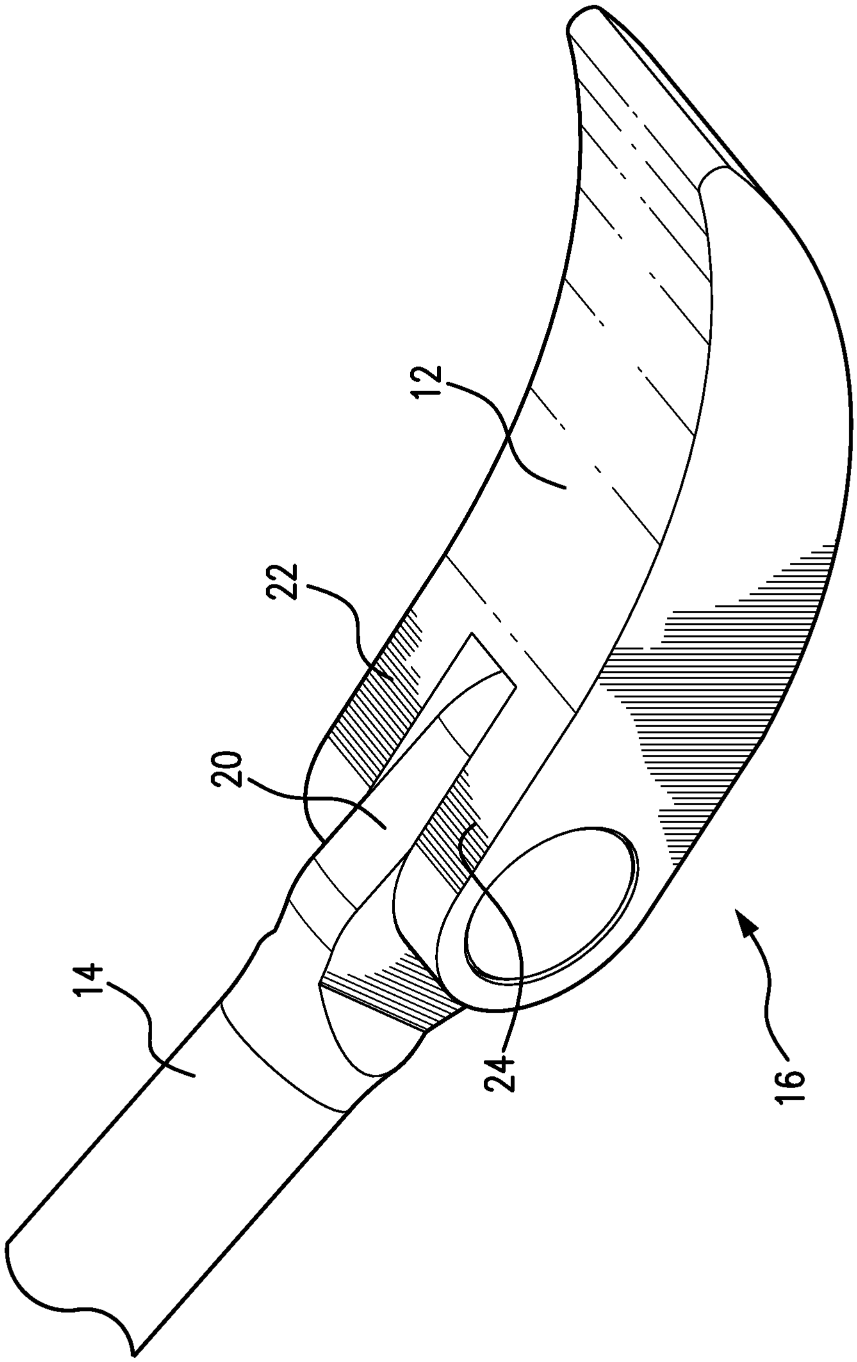
FIG. 2 is perspective view of a second preferred embodiment of the indexable pry tool.

Shown in FIG. 2 is a second preferred embodiment of indexable tool 10. In this second embodiment, like the first embodiment, the indexable tool body 12 is rotatably joined to handle 14 via the splined coupling subassembly 16. However in this embodiment, the prongs 22 and 24 are fixedly mounted to tool 12, while the foot 20 is fixedly mounted to the handle 14.

In the following detailed description, the first embodiment is described in detail, but one can appreciate that the second embodiment works in exactly the same fashion as the first embodiment, the difference being merely that in the second embodiment the foot 20 is fixedly attached to the handle 14, while the prongs 22 and 24 are fixedly attached to the indexable tool body 12.

Figure 3:
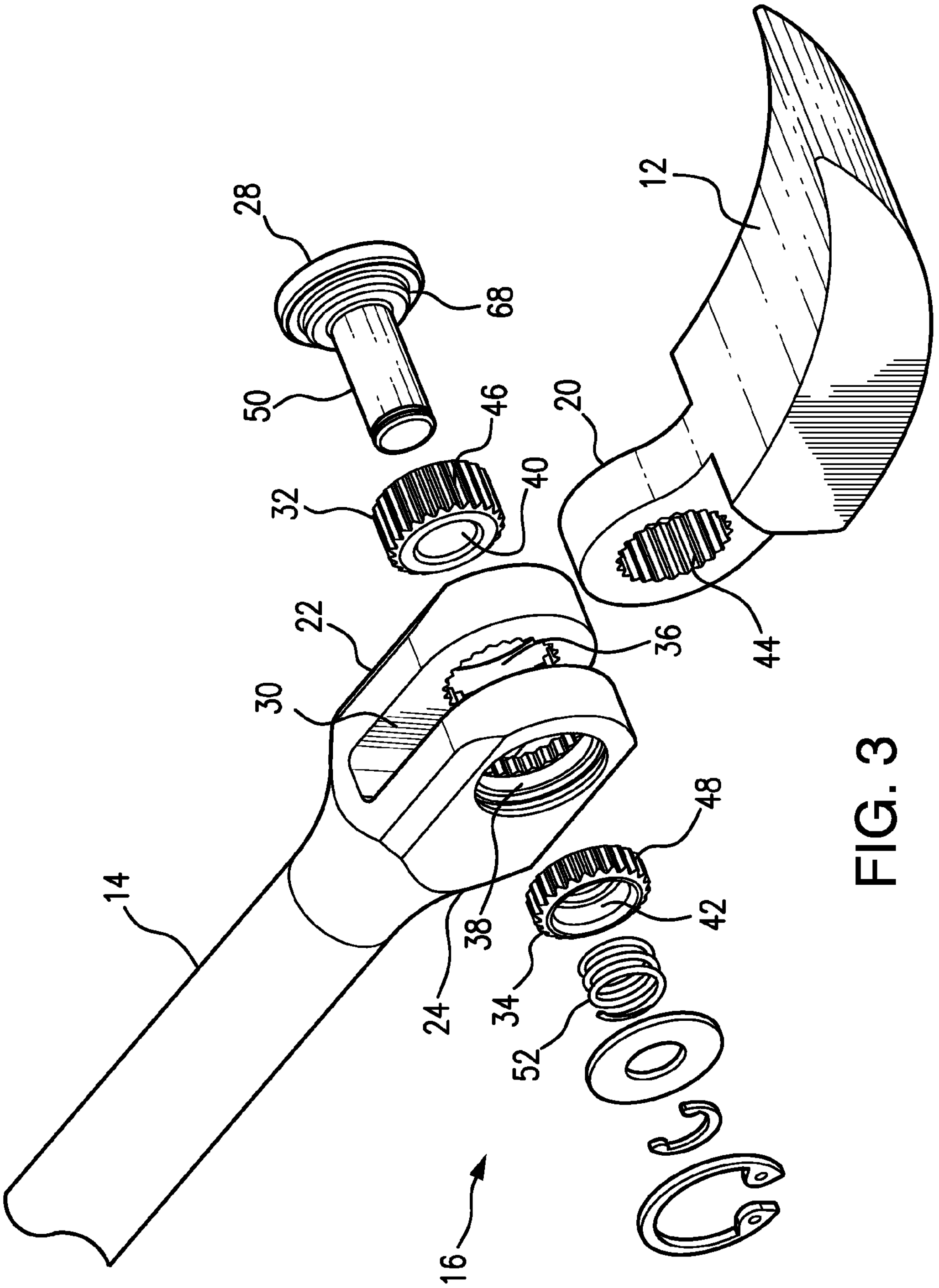
FIG. 3 is an exploded view of the preferred embodiment shown in FIG. 1.

Refer now to FIG. 3, which shows an exploded view of the splined coupling subassembly 16.

The splined coupling subassembly 16 comprises the following parts: a push button 28, a first serrated insert 32, a second serrated insert 34, a spring 52, a cap 54, a cap retainer ring 56 and a push button retainer clip 58. The serrated inserts 32 and 34 together form a splined cylinder arrangement. They have the same nominal outer diameter, but the height of the first serrated insert 32 is larger than the height of the second serrated insert 34. First serrated insert 32 has a splined outer surface 46 and second serrated insert 34 has a splined outer surface 48.

The foot 20 is fixedly mounted to the indexable tool body 12, shown in this embodiment as a curved pry bar. Foot 20 is formed with a splined orifice 44.

The first prong 22 and the second prong 24 are parallel to each other and fixedly mounted to the end of handle 14. First prong 22 and second prong 24 are separated by a slot 30, configured to receive foot 20. Prongs 22 and 24 are commonly provided with throughholes 36 and 38, respectively that are aligned with the splined orifice 44 of the foot 20.

Figure 4:
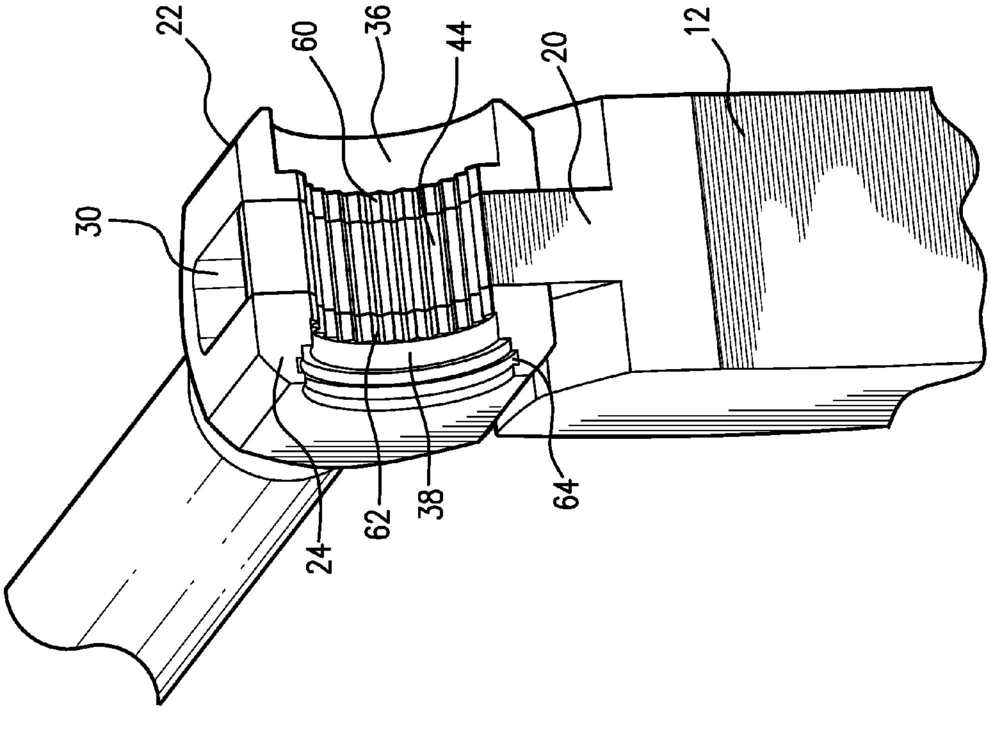
FIG. 4 is a cutaway view of a portion of the preferred embodiment shown in FIG. 1.

Turn now to FIG. 4 which shows a cutaway view of prongs 22, 24 and foot 20. Looking at first prong 22, it can be seen that a splined annular shoulder 60 projects radially from the throughhole 36. A splined annular shoulder 62 projects radially from the throughhole 38 in the second prong 24. As can be seen in FIG. 4, these splined annular shoulders 60 and 62 are positioned against the inner surfaces of slot 30, such that the splined annular shoulders 60, 62 align with the splined orifice 44 of foot 20, when foot 20 is positioned in slot 30. As shown in cutaway in FIG. 4, these splined annular shoulders 60 and 62 are configured and arranged to line up with and form a continuous splined inner surface with orifice 44 in the foot 20.

Figure 5:
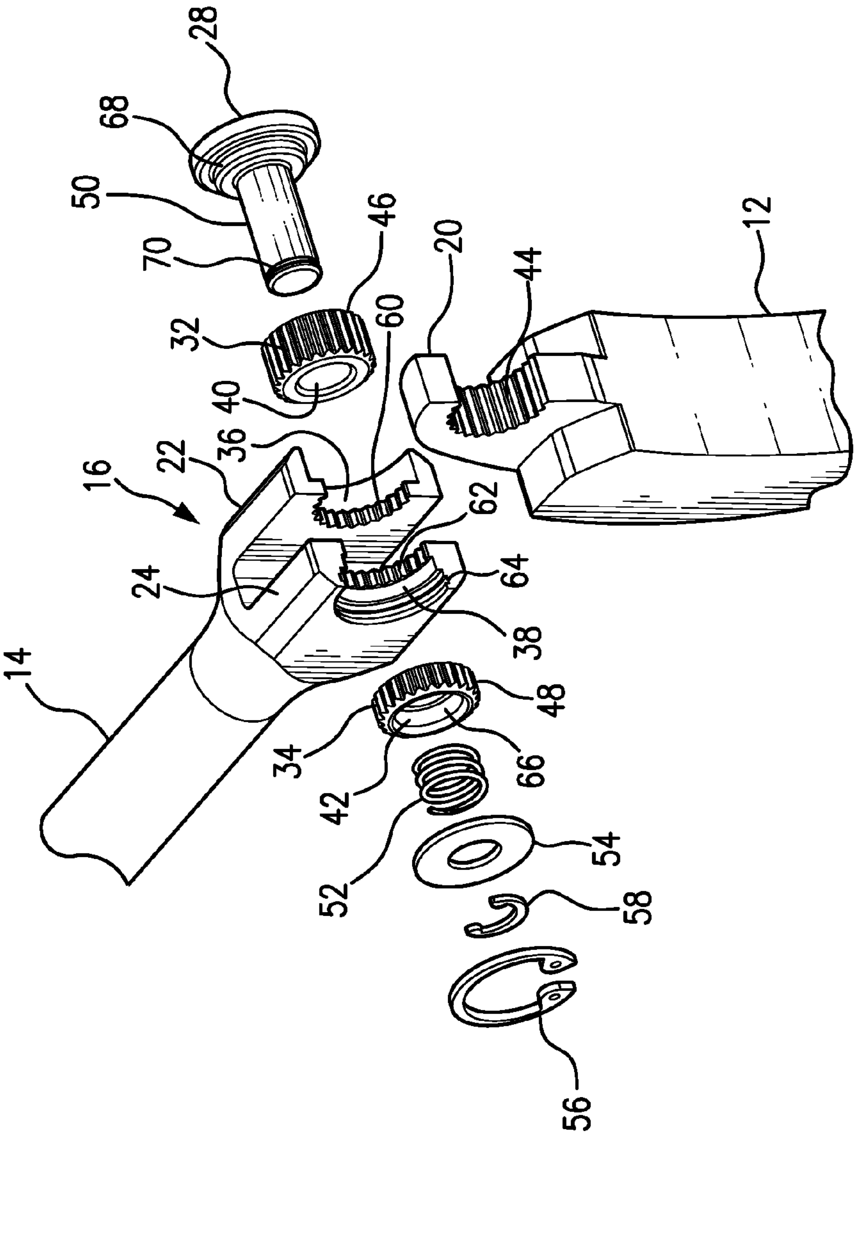
FIG. 5 is a cutaway view of a portion of the preferred embodiment shown in FIG. 1.

Shown in FIG. 5, serrated inserts 32 and 34 have throughholes 40 and 42, respectively. These throughholes 40, 42 are formed to line up with splined throughholes 36, 38 on prongs 22 and 24. The serrated inserts 32 and 34 are configured and arranged so that they are adjacently disposed and their splined outer surfaces 46, 48 can fit intimately and slidably into the splined annular shoulders 60, 62 projecting from throughholes 36, 38 on the prongs 22 and 24, and the splined orifice 44 of foot 20. Looking more closely at second serrated insert 34, it can be seen that an annular shoulder 66 radially projects from the throughhole 42 of the second serrated insert 34. The inner diameter of this annular shoulder 66 is the same as the diameter of the throughhole 40 of the first serrated insert 32, and thus the throughhole 42 of the second serrated insert 34 is a larger diameter than the throughhole 36 of the first serrated insert 32.

Look now at push button 28 shown in FIG. 5. The pushbutton 28 is fixedly mounted to a push button cylinder 50. Push button cylinder 50 is constructed and arranged such that the first and second serrated inserts 32 and 34 can be slidably mounted onto push button cylinder 50 and be free to rotate.

Projecting axially from pushbutton 28 at the junction of pushbutton 28 and pushbutton cylinder 50 is an annular shoulder 68. On the end of pushbutton cylinder 50, is circumferentially machined a pushbutton retainer notch 70 extending radially on the surface of pushbutton cylinder 50. The pushbutton retainer clip 58 is constructed and arranged so that it can slightly expand to slide onto this notch 70 and then spring back into place such that it cannot fall out of the notch 70.

Looking now at throughhole 38 in the second prong 24, it can be seen that a cap retainer notch 64 is machined radially into the inner surface of throughhole 38. Cap retainer ring 56 is constructed and arranged so that it can be slightly compressed so that it can be pressed into the cap retainer notch 64, and then spring back to its original size such that it is retained in cap retainer notch 64.

Assembly of the splined coupling system 16 is as follows.

Figure 6:
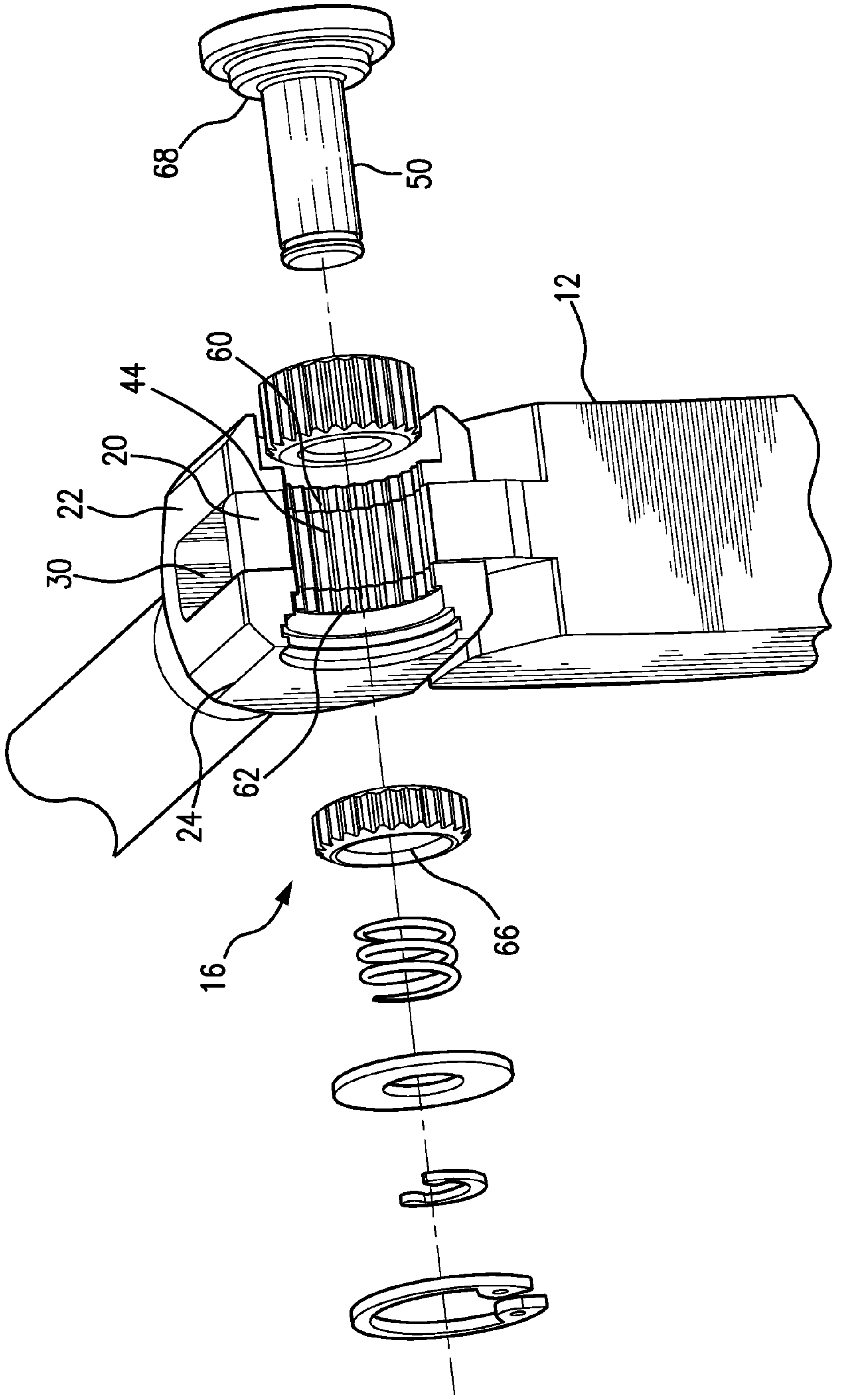
FIG. 6 is a cutaway view of a portion of the preferred embodiment shown in FIG. 1.
Figure 7:
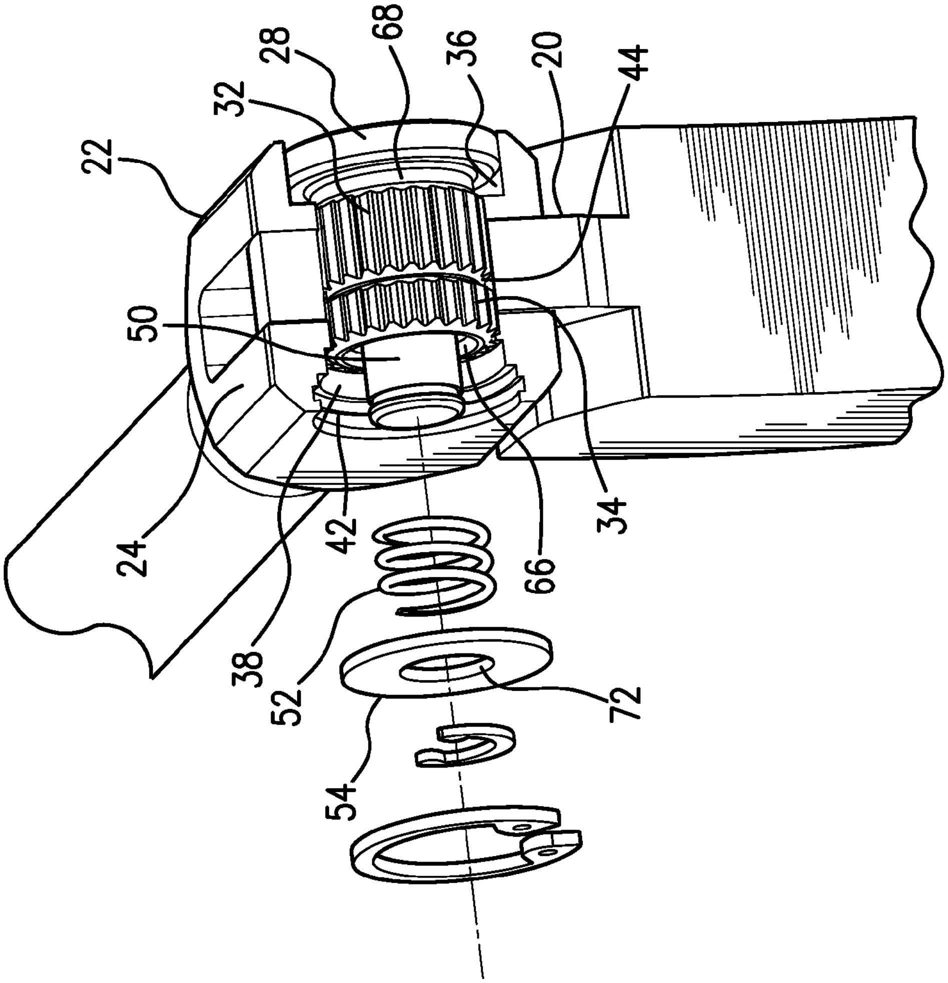
FIG. 7 is a cutaway view of a portion of the preferred embodiment shown in FIG. 1 in a partially assembled configuration.

Shown in FIG. 6 the foot 20 is placed into slot 30, so that the splined orifice 44 of foot 20 is aligned with splined annular shoulders 60 and 62 of first and second prongs 22 and 24. As shown in FIG. 7, install the push button 28 through the throughhole 36 in the first prong 22, through splined orifice 44 in foot 20 and then into the throughhole 38 in the second prong 24. Slide the first serrated insert 32 onto the push button cylinder 50 through the throughhole 38 of the second prong 24, the foot 20 and then through the throughhole 36 in the first prong 22, so that serrated insert 32 seats on the pushbutton shoulder 68.

Next, slide the second serrated insert 34 onto pushbutton cylinder 50, so that the outer surface of annular shoulder 66 is in intimate contact with the first serrated insert 32. The spring 52 is then inserted over pushbutton cylinder 50 and seated against the inner surface of annular shoulder 66 in the second serrated insert 34. The throughhole 42 of the second serrated insert 34, the spring 52 and the pushbutton cylinder 50 are constructed and arranged so that the spring 52 fits over pushbutton cylinder 50 and into throughhole 42 so that rotation of the second serrated insert 34 is not impeded.

Figure 8:
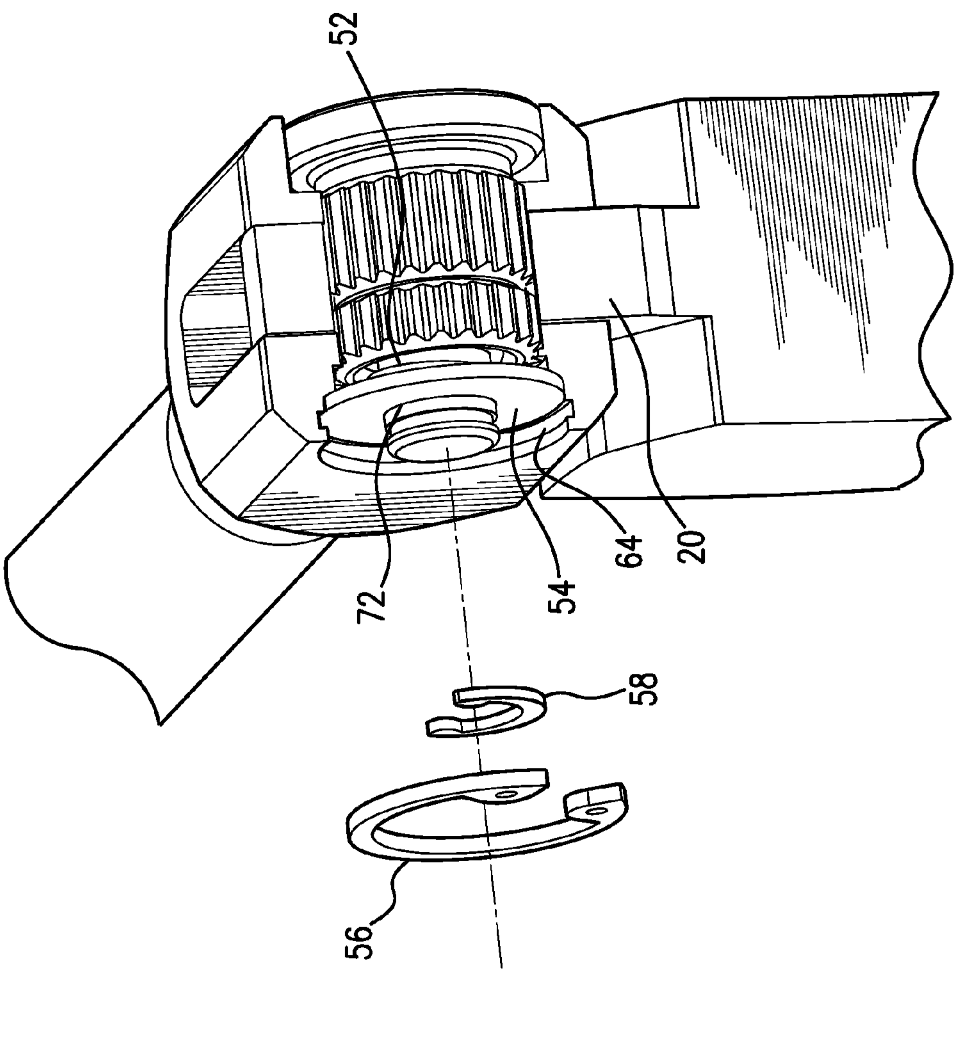
FIG. 8 is a cutaway view of a portion of the preferred embodiment shown in FIG. 6 in a more completely assembled configuration.

Looking now at FIG. 8, the cap 54 is placed onto pushbutton cylinder 50. The cap 54 is essentially a flat disc with a hole 72 in the center. This hole 72 is shown more clearly in FIG. 7. The hole 72 is sized so that it fits closely onto pushbutton cylinder 50 and presses against spring 52 and thus compresses spring 52 tightly against the inner surface of annular shoulder 66 of the second serrated insert 34.

Figure 9:
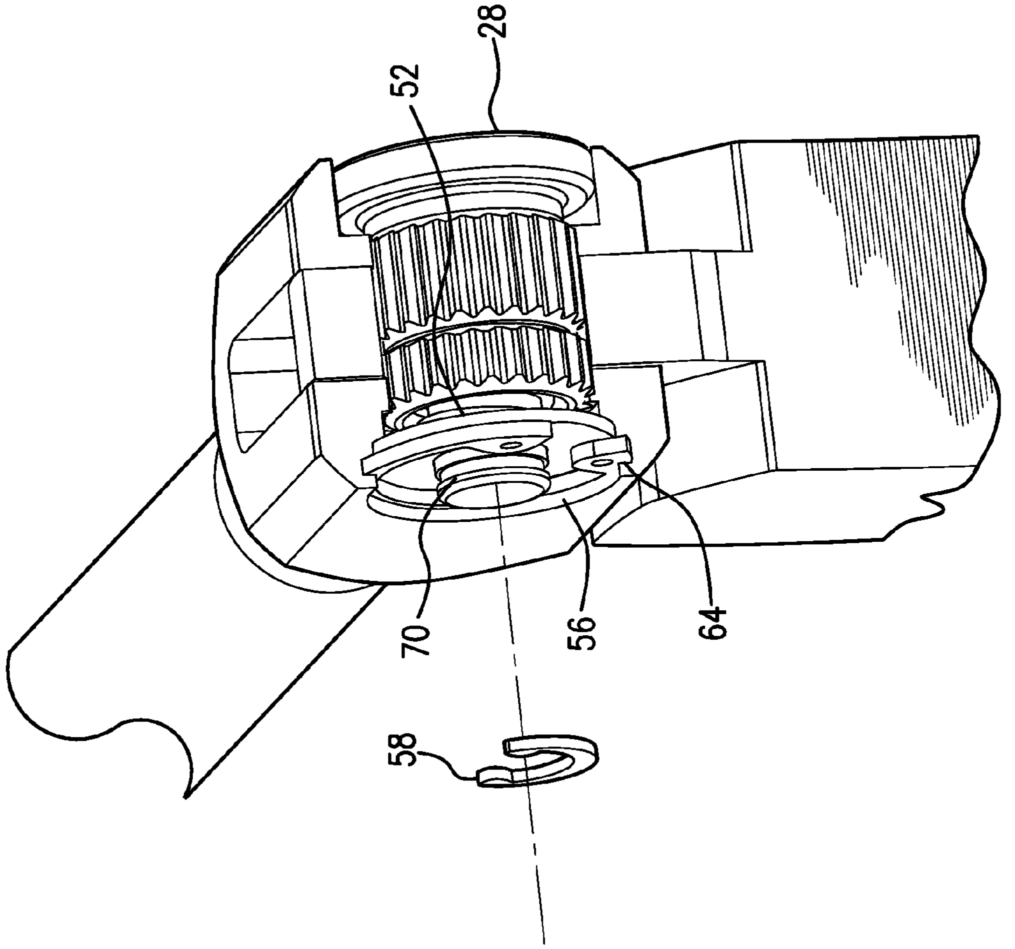
FIG. 9 is a cutaway view of a portion of the preferred embodiment shown in FIG. 7 in a more completely assembled configuration.

Shown in FIG. 9, the cap retainer ring 56 is pressed into the cap retainer notch 64. Finally, the push button retainer clip 58 is installed into the pushbutton retainer notch 70 thus locking the pushbutton 28 into place against the bias of spring 52.

Figure 10:
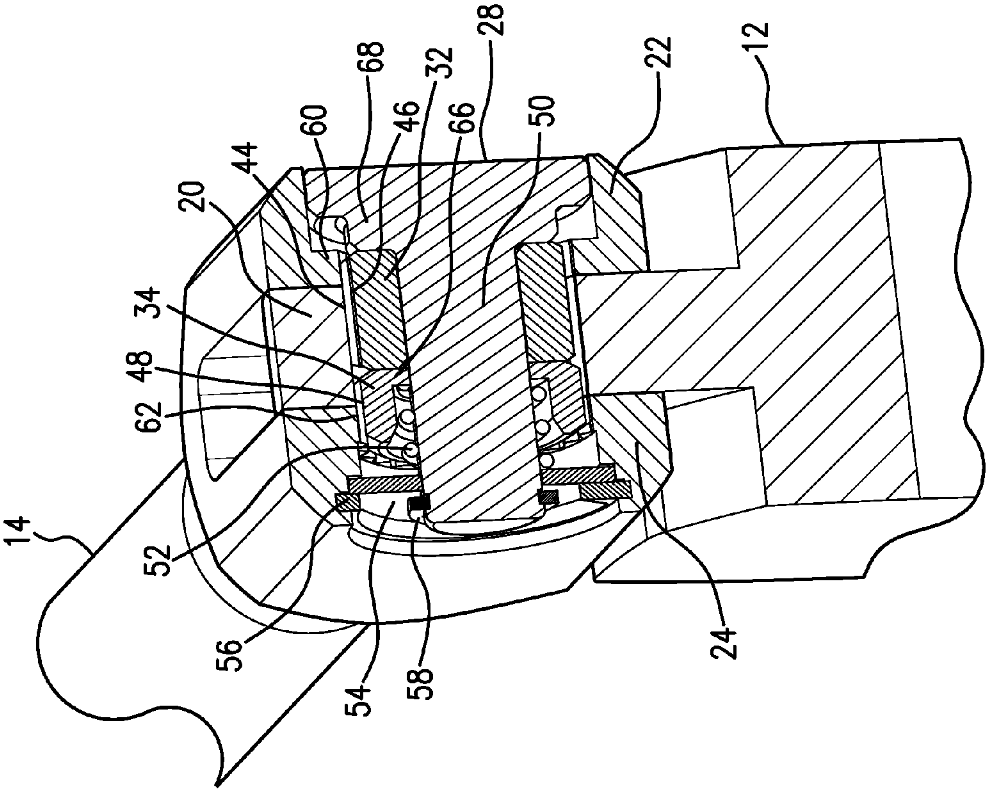
FIG. 10 is a cross-sectional view of the preferred embodiment shown in FIG. 8 as fully assembled and in the locked position.
Figure 11:
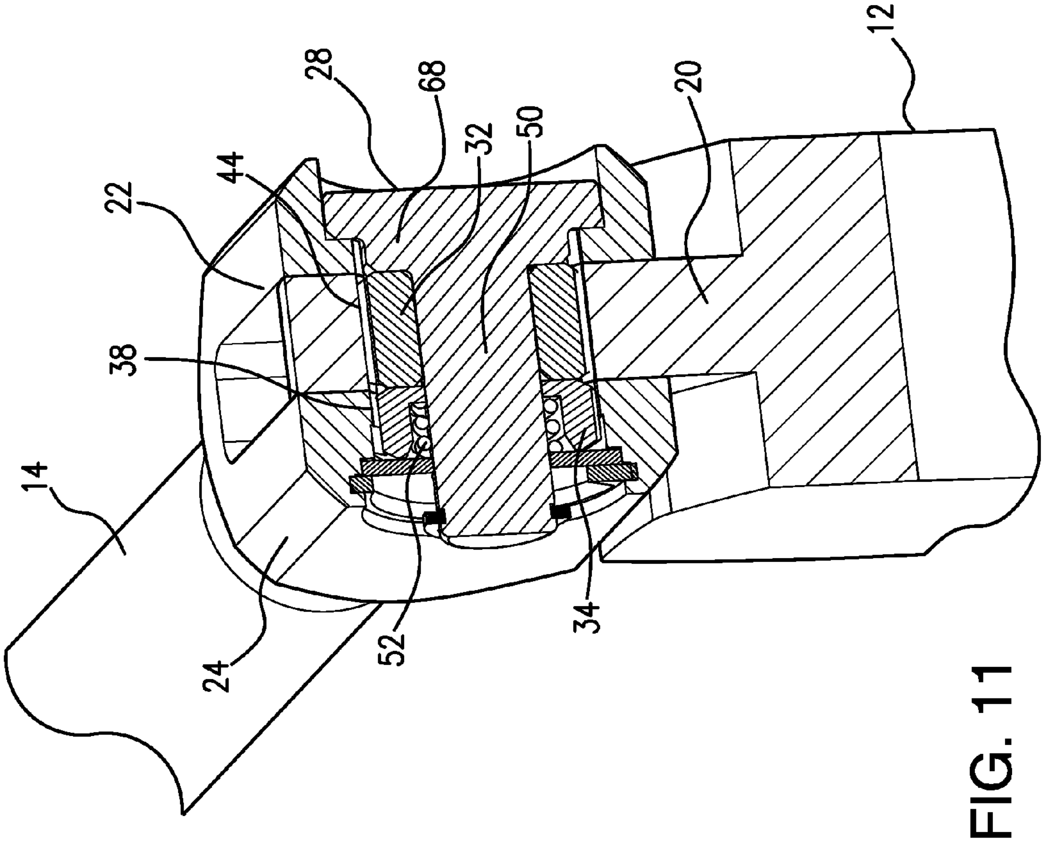
FIG. 11 is a cross-sectional view of the preferred embodiment shown in FIG. 8 as fully assembled and in the unlocked position.

In operation, the splined coupling subassembly 16 has a locked and an unlocked position, shown in cutaway in FIGS. 10 and 11, respectively.

In the locked position, shown in cutaway in FIG. 10, the spring 52 presses against the inner surface of annular shoulder 66 on second serrated insert 34. This presses the second serrated insert 34 into intimate contact with the first serrated insert 32 which then presses into intimate contact with pushbutton shoulder 68. The end of the spring 52 opposite the second serrated insert 34 presses against the inner surface of cap 54. Cap 54 is held in place against the bias of spring 52 with the cap retainer ring 56. The pushbutton 28 is held in place against the bias of spring 52 by pushbutton retainer clip 58. This places the splined outer surfaces 46, 48 of inserts 32, 34 in interlocking engagement with the splined orifice 44 of foot 20. As shown in cutaway in FIG. 10, the first serrated insert 32 is constructed and arranged to engage simultaneously with both the splined orifice 44 of foot 20 and the splined annular shoulder 60 of the first prong 22. In an analogous fashion, the second serrated insert 34 is constructed and arranged to engage simultaneously with both the splined orifice 44 of foot 20 and the splined annular shoulder 62 of the second prong 24. Thus, the indexable tool body 12 is held in fixed relation to and is unable to rotate with respect to the handle 14.

In the unlocked position, shown in cutaway in FIG. 11, manual pressure is applied to pushbutton 28 against the bias of spring 52. This manual pressure pushes the first serrated insert 32 entirely into the splined orifice 44 of foot 20. The action of the manual pressure pushes second serrated insert 34 entirely into the throughhole 38 of the second prong 24. Second serrated insert 34 is thus held in fixed relation only to the second prong 24. The first serrated insert 32 is held in fixed relation only to foot 20 and thereby to indexable tool body 12. The first serrated insert 32 and indexable tool body 12 are thus free to rotate about the push button cylinder 50.

As a result, when manual pressure is applied to push button 28, indexable tool body 12 and handle 14 may be independently rotatably positioned to a new position with respect to each other. When the manual pressure to the push button 28 is released, the serrated inserts 32, 34 are again slidably pushed back to the locked position shown in FIG. 10, and again the handle 14 and indexable tool body 12 are held in a new, but fixed relation and are unable to rotate with respect to each other.

Figure 12:
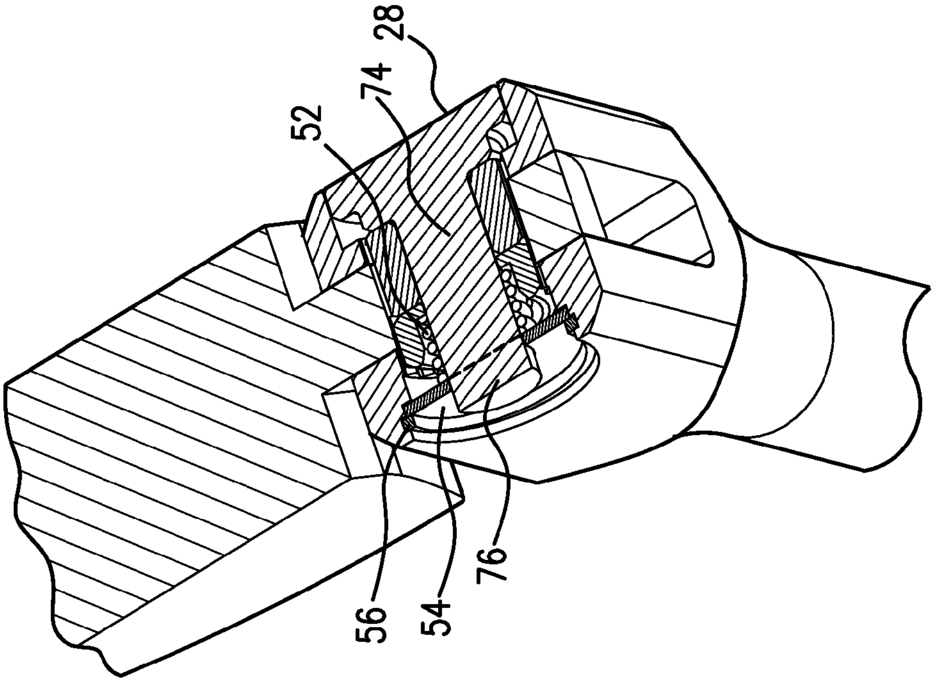
FIG. 12 is a cross-sectional view of a third preferred embodiment shown as assembled but not deformed and in the locked position.
Figure 13:
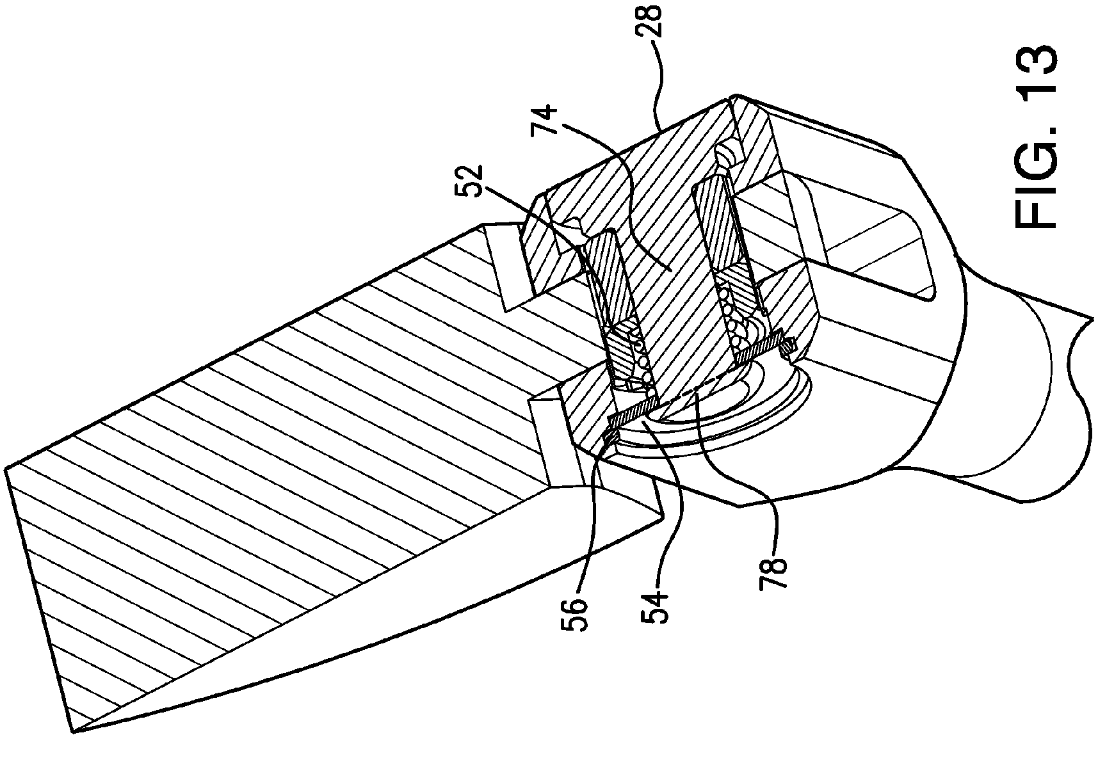
FIG. 13 is a cross-sectional view of a third preferred embodiment shown as fully assembled and deformed, in the locked position.

Turn now to FIGS. 12 and 13. FIG. 12 shows a cutaway view of a third preferred embodiment of the indexable tool 10 in which the tool is almost completely assembled. FIG. 13 shows a cutaway view of the third preferred embodiment of the indexable pry tool 10 in the locked position. Comparing FIGS. 12 and 13 to FIG. 10, one can see that the pushbutton cylinder 50 in the first preferred embodiment has been replaced with a deformable pushbutton cylinder 74 which is fixedly attached to pushbutton 28. The deformable pushbutton cylinder 74 does not have machined into it, a pushbutton retainer notch 70 as shown in FIG. 10 on pushbutton cylinder 50. Rather, deformable pushbutton cylinder 74 is made of a suitable material such that after assembly, the end 76 of deformable pushbutton cylinder 74 may be deformed, by a suitable tool, such as a hammer, to spread out and "mushroom", forming a mushroomed endcap 78, shown in FIG. 13. This mushroomed endcap 78 locks the pushbutton 28 into place against the bias of spring 52. The pushbutton retainer clip 58, shown in FIG. 10, has thus been eliminated.

Thus described are an indexable pry tool and a splined coupling subassembly therefor.

In a first embodiment, the pry tool comprises a handle having a first prong formed with a first splined annular shoulder and a second prong formed with a second splined annular shoulder; an indexable tool body fixedly coupled to a foot, the foot having a splined orifice aligned with the first splined annular shoulder and the second splined annular shoulder; and a splined coupling subassembly rotatably joining and selectively locking and unlocking the handle and the indexable tool body in relation to each other. In a second preferred embodiment, the pry tool comprises an indexable tool body having a first prong formed with a first splined annular shoulder and a second prong formed with a second splined annular shoulder; a handle fixedly coupled to a foot, the foot having a splined orifice aligned with the first splined annular shoulder and the second splined annular shoulder; and a splined coupling subassembly rotatably joining and selectively locking and unlocking the handle and the indexable tool body in relation to each other.

The splined coupling subassembly comprises a push button fixedly coupled to a push button cylinder, the pushbutton cylinder being disposed within the first and second splined annular shoulders and the splined orifice for slidable movement relative thereto; at least a first serrated insert and a second serrated insert, the first serrated insert being positioned on the push button cylinder; the second serrated insert being positioned on the push button cylinder and in intimate contact against the first serrated insert; the first and second serrated inserts having outer splined surfaces variously engaged with the first splined annular shoulder and the second splined annular shoulder and the splined orifice upon slidable movement of the push button; a cap disposed within the second prong and held in fixed relation thereto with a cap retention ring; a push button retainer clip fixedly coupled to the push button cylinder; a spring interposed between the cap and the second serrated insert wherein, in a locked position, the spring is biased to hold the splined outer surfaces of the first and second serrated inserts in common interlocking engagement with the splined orifice of the foot and the first and second splined annular shoulders to prevent relative rotation between the tool body and the handle; and wherein in an unlocked position the push button is pushed against the bias of the spring to slidably move the splined outer surface of the first insert into exclusive engagement with the splined orifice of the foot, and the second insert into exclusive engagement with the second splined annular shoulder, thus enabling relative rotary movement of the handle relative to the indexable tool.

In a third preferred embodiment, the pushbutton cylinder is made of a deformable material, such that such that after assembly, the end of the deformable pushbutton cylinder may be deformed, by a suitable tool, such as a hammer, to spread out and "mushroom", forming a mushroomed endcap. This mushroomed endcap locks the pushbutton into place against the bias of the spring. The pushbutton retainer clip is thus eliminated in the third preferred embodiment.

The described embodiments are to be considered in all respects only as illustrative and not restrictive, and the scope of the invention is, therefore, indicated by the appended claims rather than by the foregoing description. Those of skill in the art will recognize changes, substitutions and other modifications that will nonetheless come within the scope of the invention and range of claims.

What is claimed is:

1. An indexable tool comprising:

a first prong and a second prong;

a foot, rotationally coupled to the first prong and the second prong; and a splined coupling subassembly constructed and arranged to couple the first prong and the second prong to the foot;

the splined coupling subassembly having a push button, a push button cylinder fixedly mounted to the push button, a splined cylinder arrangement mounted on the push button cylinder, a cap, a cap retainer ring and a push button retainer subassembly, the push button retainer subassembly being fixedly mounted to the push button cylinder to fixedly couple and prevent relative sliding movement of the push button cylinder and the splined cylinder arrangement, the push button retainer subassembly further having a push button retainer clip and a notch machined circumferentially around the end of the push button cylinder to receive the push button retainer clip;

wherein the splined cylinder arrangement is movable to a locked position, thereby engaging the first prong and the second prong with the foot and maintaining the first prong and the second prong in fixed relation to the foot, and wherein the splined cylinder arrangement is movable to an unlocked position, thereby disengaging the first prong and the second prong and the foot and maintaining the first prong and the second prong in rotary relation to the foot.

2. The indexable tool of claim 1, wherein the foot is fixedly attached to an indexable tool body and the first prong and the second prong are fixedly attached to a handle.

3. The indexable tool of claim 2, wherein the indexable tool body comprises a curved pry bar.

4. The indexable tool of claim 1, wherein the foot is fixedly attached to a handle and the first prong and second prong are fixedly attached to an indexable tool body.

5. The indexable tool of claim 4, wherein the indexable tool body comprises a curved pry bar.

6. The indexable tool of claim 1, wherein the cap retainer ring is fixedly mounted to the second prong.

7. The indexable tool of claim 1 wherein the push button retainer subassembly comprises a mushroomed end cap on the pushbutton cylinder.

8. An indexable tool comprising:

a handle;

an indexable tool body;

a first prong formed with a first spline annular shoulder and a second prong, formed with a second splined annular shoulder;

a foot, the foot having a splined orifice aligned with the first splined annular shoulder and the second splined annular shoulder; and a spline coupling subassembly rotatably joining and selectively locking and unlocking the handle and the indexable tool body in relation to each other;

the splined coupling subassembly having a push button fixedly coupled to a push. button cylinder, a first serrated insert positioned on the push button cylinder and a second serrated insert positioned on the push button cylinder. in operative association with the first serrated insert;

the push button cylinder being disposed within the first and second splined annular shoulders and the splined orifice for slidable movement relative thereto;

the first and second serrated inserts having outer splined surfaces variously engaged with the first splined annular shoulder and the second splined annular shoulder and the splined orifice upon slidable movement of the push button;

a cap disposed within the second prong and held in fixed relation thereto with a cap retention ring;

a push button retainer subassembly fixedly coupled to the push button cylinder to fixedly couple and prevent relative sliding movement of the push button cylinder, the first serrated insert and the second serrated insert;

a clip mounted in a notch machined. circumferentially into the end of the push button cylinder: and a spring interposed between the cap and the second serrated insert wherein the splined coupling subassembly is movable between (a) a locked position, wherein the spring is biased to hold the splined outer surfaces of the first and second serrated inserts in common interlocking engagement with the splined orifice of the foot and the first and second splined annular shoulders to prevent relative rotation between the tool body and the handle, and (b) an unlocked position, wherein the push button is pushed against the bias of the spring to slidably move the splined outer surface of the first insert into exclusive engagement with the shred orifice of the toot, and the second insert into exclusive engagement with the second splined annular shoulder, thereby disengaging the handle and the body and maintaining the handle in rotatable relation to the tool body.

9. The indexable tool of claim 8 wherein the push button retainer subassembly comprises a mushroomed endeap on the end of the push button cylinder.

10. The indexable tool of claim 8 wherein the first prong and the second prong are fixedly mounted to the handle and the foot is fixedly mounted to the indexable tool body.

11. The indexable tool of claim 8 wherein the first prong and the second prong are fixedly mounted to the indexable tool body and the foot is fixedly mounted to the handle.

12. The indexa hie tool of claim 8, wherein the second prong has a notch machined to receive the cap retention ring.

13. The indexable tool of claim 8, wherein the first serrated insert and the second serrated insert have different heights.

14. The indexable tool of claim 8, wherein the first and second serrated inserts have longitudinally extending splines that form a continuous splined surface along the combined heights of the inserts.

15. The indexable tool of claim 8 wherein the indexable tool body comprises a curved pry bar.

* * * * *